US012740580B2

(12) United States Patent
Boone

(10) Patent No.: US 12,740,580 B2
(45) Date of Patent: Sep. 22, 2026

(54) EGG REPLACER

(71) Applicant: Allied Blending LP, Keokuk, IA (US)

(72) Inventor: Leslie Boone, St. Louis, MO (US)

(73) Assignee: ALLIED BLENDING, Keokuk, IA (US)

( * ) Notice: Subject to any disclaimer, the term of this patent is extended or adjusted under 35 U.S.C. 154(b) by 352 days.

(21) Appl. No.: 18/330,920

(22) Filed: Jun. 7, 2023

(65) Prior Publication Data

US 2023/0389582 A1 Dec. 7, 2023

Related U.S. Application Data

(60) Provisional application No. 63/365,988, filed on Jun. 7, 2022.

(51) Int. Cl.
*A23L 15/00* (2026.01)

(52) U.S. Cl.
CPC .................................... *A23L 15/35* (2016.08)

(58) Field of Classification Search
CPC ........................................................ A23L 15/35
USPC ........................................................... 426/634
See application file for complete search history.

(56) References Cited

U.S. PATENT DOCUMENTS

2013/0052304 A1* 2/2013 Li ......................... A23L 29/212 426/654
2021/0186067 A1* 6/2021 Zaccano ................. A23L 11/01
2022/0192239 A1* 6/2022 Geistlinger ............. A23L 15/35

FOREIGN PATENT DOCUMENTS

EP 3216353 A1 * 9/2017 ............. A23L 15/35

* cited by examiner

*Primary Examiner* — Brent T O'Hern
(74) *Attorney, Agent, or Firm* — Husch Blackwell LLP

(57) ABSTRACT

Provided are egg replacers, comprising chickpea protein and substantially free from rising agent. Also provided are egg replacers, comprising 40-95 wt % starch; 5-40 wt % alternative protein; 1-10 wt % gellant; and 1-10 wt % soluble fiber, for example an egg replacer, comprising: 15-40 wt % potato starch; 8-30 wt % chickpea protein; 30-54 wt % modified food starch; 1-7 wt % dextrose; 0.5-5 wt % sucrose; 1-6 wt % xanthan gum; and 2-7 wt % methylcellulose. Also provided are mixes for a food product comprising the egg replacer, methods of using the egg replacer, and food products comprising an egg replacer.

22 Claims, 2 Drawing Sheets

EGG REPLACER

This application claims the benefit of priority of the U.S. Provisional Patent Application Ser. No. 63/365,988, filed Jun. 7, 2022, the disclosure of which is incorporated by reference in its entirety for all purposes.

This disclosure relates to food ingredients, particularly egg replacers for food products, such as baked goods.

The demand for egg replacers has spiked in the food industry due to Avian-Bird flu which has impacted the availability and pricing of eggs. According to the United States Department of Agriculture, in May 2022, 34 states had confirmed cases and had to depopulate over 37.55 M egg-laying hens. The demand is also heightened due to consumers' interest in plant-based products. Consumers and manufacturers use eggs for various applications, such as baking, coating adhesion, sauces, whipping, and salad dressings. The egg has various functional properties, such as emulsification, texturing, and expansion, to impart porosity, binding, and contributing protein.

Market research shows commercial egg substitutes are categorized into baking, omelet, and scramble applications. These products typically contain leavening ingredients, pigments, allergens, and/or off odor. Since commercial baking mixes and homemade recipes often already contain leavening, using an egg replacer, which also contains leavening, may negatively affect the quality of the baked product. Also, many commercial egg substitutes do not contain protein.

The preceding examples of the related art and limitations related in addition to that are intended to be illustrative and not exclusive. Other limitations of the related art will become apparent to those of skill in the art upon a reading of the specification and a study of the drawings.

The following embodiments and aspects thereof are described and illustrated in conjunction with compositions and methods, which are meant to be exemplary and illustrative, not limiting in scope. In various embodiments, one or more of the above-described problems have been reduced or eliminated, while other embodiments are directed to other improvements.

The present disclosure provides an egg replacer comprising chickpea protein and substantially free from rising agents The present disclosure also provides an egg replacer comprising 40-80 wt % starch, 5-30 wt % alternative protein, 1-10 wt % gellant, and 1-20 wt % soluble fiber.

The present disclosure further provides a mix for a food product, the mix comprising 4 teaspoons (12.5 g) of an egg replacer disclosed herein for each egg that would have been used in the mix without the egg replacer.

The present disclosure provides a method of using an egg replacer, comprising mixing 4 teaspoons (12.5 g) of an egg replacer disclosed herein and 2.5 tablespoons (37.5 g) of water to form one portion of hydrated egg replacer.

The present disclosure provides a food product comprising an egg replacer disclosed herein, for example, a food production free from egg or in the form of a cupcake.

Additional embodiments and features are set forth in part in the description that follows. In part will become apparent to those skilled in the art upon examination of the specification or may be learned by the practice of the embodiments discussed herein. A further understanding of the nature and advantages of certain embodiments may be realized by reference to the remaining portions of the specification and the drawings, which form a part of this disclosure.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

DETAILED DESCRIPTION

Figure 1:
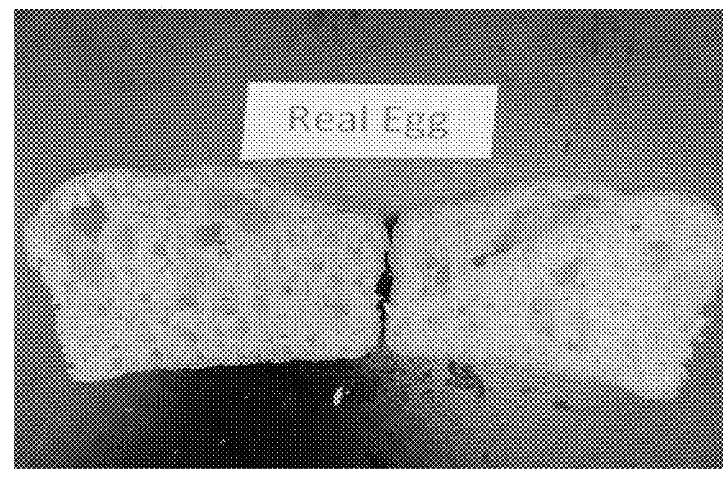
FIG. 1 shows a cupcake made with real egg as a positive control.

The present disclosure provides an egg replacer comprising chickpea protein and substantially free from rising agents.

The present disclosure also provides an egg replacer comprising 40-80 wt % starch, 5-30 wt % alternative protein, 1-10 wt % gellant, and 1-20 wt % soluble fiber.

Suitable starches include vegetable starches (e.g., potato starch, pea starch, tapioca) and grain starches (e.g., corn starch, wheat starch, rice starch). Specific examples of suitable corn starches include dent corn starch, waxy corn starch, and high amylose corn starch. The starches can be used individually or in combination. In certain embodiments, the starch can be modified or native. Modified food starches differ in their degree of cross-linking, type of chemical substitution, oxidation level, degree of molecular scission, and the ratio of amylose to amylopectin.

Major starch sources include cereals (rice, wheat, and maize) and root vegetables (potatoes and cassava). Other starch sources include, but are not limited to, acorns, arrowroot, arracacha, bananas, barley, breadfruit, buckwheat, canna, colocasia, katakuri, kudzu, malanga, millet, oats, oca, arrowroot, sago, sorghum, sweet potatoes, rye, taro, chestnuts, water chestnuts, yams, and many kinds of beans, such as favas, lentils, mung beans, peas, and chickpeas.

Upon cooking, starch is transformed from an insoluble, difficult-to-digest granule into readily accessible glucose chains with nutritional and functional properties. The amylose/amylopectin ratio, molecular weight, and fine molecular structure influence the physicochemical properties and energy release of different types of starches. In addition, cooking and food processing impact starch digestibility and energy release. Starch has been classified as rapidly digestible, slowly digestible, and resistant starch, depending upon its digestion profile. Raw starch granules resist digestion by human enzymes and do not break down into glucose in the small intestine—they reach the large intestine and function as prebiotic dietary fiber. When starch granules are fully gelatinized and cooked, the starch becomes easily digestible and releases glucose quickly within the small intestine. When starchy foods are cooked and cooled, some glucose chains re-crystallize and become resistant to digestion again. Slowly digestible starch can be found in raw cereals, where digestion is slow but relatively complete within the small intestine. Widely used prepared foods containing starch are bread, pancakes, cereals, noodles, pasta, porridge, and tortilla.

Starch gelatinization during cake baking can be impaired by sugar competing for water, preventing gelatinization and improving texture.

For example, starches can be extracted and refined from seeds, roots, and tubers, for example, by wet grinding, washing, sieving, and drying. In certain embodiments, the starch is chosen from corn, tapioca, arrowroot, wheat, rice, and potato starches. In certain embodiments, the starch is chosen from sweet potato, sago, and mung bean.

Untreated starch requires heat to thicken or gelatinize. When a starch is pre-cooked, it can then be used to thicken instantly in cold water. This is referred to as a "pregelatinized starch."

Starch can be hydrolyzed into simpler carbohydrates by acids, various enzymes, or a combination. The resulting fragments are known as dextrans. The extent of conversion is typically quantified by dextrose equivalent (DE), roughly the fraction of the glycosidic bonds in starch that has been broken. For example, maltodextrin is a lightly hydrolyzed (DE 10-20) starch product used as a bland-tasting filler and thickener.

"Modified starch" is a starch that has been chemically modified to allow the starch to function under conditions frequently encountered during processing or storage, such as high heat, high shear, low pH, freeze/thaw, and cooling. Modified starches are E coded according to European Food Safety Authority and INS-coded Food Additives per the Codex Alimentarius:

1400 Dextrin
1401 Acid-treated starch
1402 Alkaline-treated starch
1403 Bleached starch
1404 Oxidized starch
1405 Starches, enzyme-treated
1410 Monostarch phosphate
1412 Distarch phosphate
1413 Phosphated distarch phosphate
1414 Acetylated distarch phosphate
1420 Starch acetate
1422 Acetylated distarch adipate
1440 Hydroxypropyl starch
1442 Hydroxypropyl distarch phosphate
1443 Hydroxypropyl distarch glycerol
1450 Starch sodium octenyl succinate
1451 Acetylated oxidized starch INS 1400, 1401, 1402, 1403, and 1405 are EU food ingredients without an E-number. Typical modified starches include cationic starches, hydroxyethyl starch, and carboxymethylated starches.

In certain embodiments, the starch is chosen from corn starch, wheat starch, rice starch, sago starch, tapioca starch, tapioca flour, sorghum starch, potato starch, and combinations thereof. In certain embodiments, the egg replacer comprises 40-80 wt % starch, such as between wt % and 45 wt %, between 45 wt % and 50 wt %, between 50 wt % and 55 wt %, between 55 wt % and 60 wt %, between 60 wt % and 65 wt %, between 65 wt % and 70 wt %, between 70 wt % and 75 wt %, and between 75 wt % and 80 wt % starch.

In certain embodiments, the egg replacer comprises 15-40 wt % potato starch and 30-45 wt % modified food starch. In certain embodiments, the egg replacer comprises 5-28 wt % potato starch and 37-44 wt % modified food starch. In certain embodiments, the egg replacer comprises 5-40 wt % potato starch, such as between 5 wt % and 10 wt %, between 10 wt % and 15 wt %, between 15 wt % and 20 wt %, between 20 wt % and 25 wt %, between 25 wt % and 30 wt %, between 30 wt % and 35 wt %, and between 35 wt % and 40 wt % potato starch. In certain embodiments, the egg replacer comprises more than 5 wt % potato starch. In certain embodiments, the egg replacer comprises less than 40 wt % potato starch. In certain embodiments, the egg replacer comprises 30-55 wt % modified food starch, such as between 30 wt % and 35 wt %, between 35 wt % and 40 wt %, between 40 wt % and 45 wt %, between 45 wt % and 50 wt %, and between 50 wt % and 55 wt % modified food starch. In certain embodiments, the egg replacer comprises more than 40 wt % modified food starch. In certain embodiments, the egg replacer comprises less than 55 wt % modified food starch.

"Alternative protein," also called "alt protein," refers to foods, ingredients, or beverages with protein derived from non-animal sources, including plants, fungi (such as yeast), and algae. Plant-based proteins refer to protein isolates derived from a plant source. Examples of plant-based proteins include, but are not limited to, seitan, tempeh, tofu, jackfruit, pea, soy, and chickpea. In certain embodiments, the alternative protein is chosen from pea, soy, yeast, and chickpea, and combinations thereof. In certain embodiments, the alternative protein comprises chickpea.

In certain embodiments, the egg replacer comprises 5-30 wt % alternative protein, such as between 5 wt % and 10 wt %, between 10 wt % and 15 wt %, between 15 wt % and 20 wt %, between 20 wt % and 25 wt %, and between 25 wt % and 30 wt % alternative protein. In certain embodiments, the egg replacer comprises 8-30 wt % alternative protein. In certain embodiments, the egg replacer comprises 10-20 wt % alternative protein. In certain embodiments, the egg replacer comprises 13-20 wt % alternative protein. In certain embodiments, the egg replacer comprises 13-30 wt % alternative protein. In certain embodiments, the egg replacer comprises more than 5 wt % alternative protein. In certain embodiments, the egg replacer comprises less than 30 wt % alternative protein.

In certain embodiments, the alternative protein is chickpea.

The "chickpea" or "chick pea" (*Cicer arietinum*) is an annual legume of the family Fabaceae, subfamily Faboideae. Its different types are variously known as gram or Bengal gram, garbanzo or garbanzo bean, or Egyptian pea. Chickpea seeds are high in protein. Cooked chickpeas are 60% water, 27% carbohydrates, 9% protein, and 3% fat. Protein digestibility and energy availability can be improved through treatments such as germination, dehulling, and heat. Cooking does not alter the chickpea protein's total protein and carbohydrate content. Germination degrades proteins to simple peptides, improving crude protein, nonprotein nitrogen, and crude fiber content. Proteins in cooked and germinated chickpeas are rich in essential amino acids such as lysine, isoleucine, tryptophan, and total aromatic amino acids In certain embodiments, the egg replacer comprises 5-30 wt % chickpea protein, including between 5 wt % and 10 wt %, between 10 wt % and 15 wt %, between 15 wt % and 20 wt %, between 20 wt % and 25 wt %, and between 25 wt % and 30 wt % chickpea protein. In certain embodiments, the egg replacer comprises 8-30 wt % chickpea protein. In certain embodiments, the egg replacer comprises 10-20 wt % chickpea protein. In certain embodiments, the egg replacer comprises 13-20 wt % chickpea protein. In certain embodiments, the egg replacer comprises 13-30 wt % chickpea protein. In certain embodiments, the egg replacer comprises more than 5 wt % chickpea protein. In certain embodiments, the egg replacer comprises less than 30 wt % chickpea protein.

A "gellant" or "stabilizer" improves the textural quality of foods. It imparts a rich mouthfeel without masking flavor, enhances moisture retention, prevents syneresis and ice crystal formation in frozen products, and forms thermally reversible gels. Examples of suitable gellants include Chondrus extract (carrageenan), pectin, gelatin, agar, and gums, including xanthan gum, guar gum, konjac flour, locust bean gum, gellan gum, and cellulose gum.

In certain embodiments, the egg replacer comprises 1-10 wt % gellant, such as between 1 wt % and 2 wt %, between 2 wt % and 3 wt %, between 3 wt % and 4 wt %, between 4 wt % and 5 wt %, between 5 wt % and 6 wt %, between 6 wt % and 7 wt %, between 7 wt % and 8 wt %, between 8 wt % and 9 wt %, and between 9 wt % and 10 wt % gellant. In certain embodiments, the egg replacer comprises 1-6 wt % gellant. In certain embodiments, the egg replacer comprises 1-5 wt % gellant. In certain embodiments, the egg replacer comprises 1-4 wt % gellant. In certain embodiments, the egg replacer comprises 4-6 wt % gellant. In certain embodiments, the egg replacer comprises more than 1 wt % gellant. In certain embodiments, the egg replacer comprise less than 10 wt % gellant.

In certain embodiments, the gellant is xanthan gum. As such, in certain embodiments, the egg replacer comprises 1-10 wt % xanthan gum, such as between 1 wt % and 2 wt %, between 2 wt % and 3 wt %, between 3 wt % and 4 wt %, between 4 wt % and 5 wt %, between 5 wt % and 6 wt %, between 6 wt % and 7 wt %, between 7 wt % and 8 wt %, between 8 wt % and 9 wt %, and between 9 wt % and 10 wt % xanthan gum. In certain embodiments, the egg replacer comprises 1-6 wt % xanthan gum. In certain embodiments, the egg replacer comprises 1-5 wt % xanthan gum. In certain embodiments, the egg replacer comprises 1-4 wt % xanthan gum. In certain embodiments, the egg replacer comprises 4-6 wt % xanthan gum. In certain embodiments, the egg replacer comprises more than 1 wt % xanthan gum. In certain embodiments, the egg replacer comprises less than 10 wt % xanthan gum.

"Soluble fiber" refers to fermentable fiber or prebiotic fiber which dissolves in water. It is generally fermented in the colon into gases and physiologically active byproducts, such as short-chain fatty acids produced in the colon by gut bacteria. Soluble fiber is generally viscous and delays gastric emptying, which, in humans, can result in an extended feeling of fullness. Inulin (in chicory root), wheat dextrin, oligosaccharides, and resistant starches (in legumes and bananas) are soluble non-viscous fibers. Some soluble fibers absorb water to become a gelatinous, viscous substance.

In certain embodiments, the soluble fiber is chosen from arabinoxylan, fructans, such as inulin, polyuronides, such as pectin (E 440) and alginates (E 400-E 407), such as sodium alginate (E 401), potassium alginate (E 402), ammonium alginate (E 403), calcium alginate (E 404), propylene glycol alginate (PGA, E 405), agar (E 406), and carrageen (E 407), raffinose, and polydextrose. In certain embodiments, the soluble fiber is a water-soluble (3-glucan, such as cellulose, modified cellulose, and methylcellulose.

In certain embodiments, the soluble fiber is chosen from cellulose, modified cellulose, methylcellulose, psyllium, inulin, beta-glucan, glucomannan, and combinations thereof.

In certain embodiments, the egg replacer comprises 2-7 wt % soluble fiber, such as between 2 wt % and 3 wt %, between 3 wt % and 4 wt %, between 4 wt % and 5 wt %, between 5 wt % and 6 wt %, and between 6 wt % and 7 wt % soluble fiber. In certain embodiments, the egg replacer comprises more than 2 wt % soluble fiber. In certain embodiments, the egg replacer comprises less than 7 wt % soluble fiber.

In certain embodiments, the soluble fiber is methylcellulose. As such, in certain embodiments, the soluble fiber comprises 2-7 wt % methylcellulose, such as between 2 wt % and 3 wt %, between 3 wt % and 4 wt %, between 4 wt % and 5 wt %, between 5 wt % and 6 wt %, and between 6 wt % and 7 wt % methylcellulose. In certain embodiments, the egg replacer comprises more than 2 wt % methylcellulose. In certain embodiments, the egg replacer comprises less than 7 wt % methylcellulose.

In certain embodiments, the egg replacer further comprises a colorant. A colorant adjusts the natural color of a food product. Examples of colorants include annatto, turmeric, titanium dioxide, carotene, and beta-carotene. Colorants may be of both natural and artificial colors. In certain embodiments, the egg replacer is substantially free of colorant, such as carotene. In certain embodiments, the egg replacer does not comprise a colorant.

In certain embodiments, the egg replacer further comprises 1-15 wt % sugar, such as about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt % sugar. In certain embodiments, the egg replacer comprises more than 1 wt % sugar. In certain embodiments, the egg replacer comprises less than 15 wt % sugar.

In certain embodiments, the sugar is chosen from glucose, dextrose, sucrose, lactose, galactose, maltose, mannose, fructose, xylose, and combinations thereof. In certain embodiments, the sugar comprises glucose, dextrose, sucrose, or combinations thereof.

In certain embodiments, the egg replacer comprises 1-7 wt % dextrose and 0.5-5 wt % sucrose. In certain embodiments, the egg replacer comprises between 2 wt % and 3 wt %, between 3 wt % and 4 wt %, between 4 wt % and 5 wt %, between 5 wt % and 6 wt %, and between 6 wt % and 7 wt % dextrose. In certain embodiments, the egg replacer comprises more than 2 wt % dextrose. In certain embodiments, the egg replacer comprises less than 7 wt % dextrose. In certain embodiments, the egg replacer comprises between 0.5 wt % and 1 wt %, 1 wt % and 2 wt %, 2 wt % and 3 wt %, between 3 wt % and 4 wt %, and between 4 wt % and 5 wt % sucrose. In certain embodiments, the egg replacer comprises more than 0.5 wt % dextrose. In certain embodiments, the egg replacer comprises less than 5 wt % dextrose.

In certain embodiments, the egg replacer comprises 20-35 wt % potato starch, 30-45 wt % modified food starch, 8-30 wt % chickpea protein, 1-7 wt % dextrose, 0.5-5 wt % sucrose, 1-5 wt % xanthan gum, and 2-7 wt % methylcellulose.

In certain embodiments, the egg replacer comprises 5-28 wt % potato starch, 37-44 wt % modified food starch, 8-30 wt % chickpea protein, 3-8 wt % dextrose, 0.5-7 wt % sucrose, 1-4 wt % xanthan gum, and 2-15 wt % methylcellulose.

The present disclosure provides a mix for a food product, the mix comprising 4 teaspoons (12.5 g) of an egg replacer disclosed herein for each egg that would have been used in the mix without the egg replacer. The range of egg replacer in the mix can vary. For example, the mix can comprise between 1 g and 1 kg egg replacer, depending on the type and amount of mix. One of skill in the art can calculate the amount of eggs for the mix and calculate the equivalent amount of egg replacer for the chosen application.

The present disclosure provides a method of using an egg replacer, comprising mixing 4 teaspoons (12.5 g) of an egg replacer disclosed herein and 2.5 tablespoons (37.5 g) of water to form one portion of hydrated egg replacer. As above, different amounts of egg replacer can be used, depending on the application.

The present disclosure provides a food product comprising an egg replacer disclosed herein, for example a food production free from egg or in the form of a cupcake.

The present disclosure may be understood by referring to the following detailed description, which is taken in conjunction with the drawings described above. For illustrative clarity, certain elements in various drawings may not be drawn to scale, may be represented schematically or conceptually, or otherwise may not correspond exactly to certain physical configurations of embodiments.

When introducing elements of the present disclosure or the embodiments(s) thereof, the articles "a," "an," "the," and "said" are intended to mean that there are one or more of the elements. The terms "comprising," "including," and "having" are intended to be inclusive and mean that there may be additional elements other than the listed elements.

Although the disclosure described herein is susceptible to various modifications and alternative iterations, specific embodiments thereof have been described in greater detail above. It should be understood, however, that the detailed description of the composition is not intended to limit the disclosure to the specific embodiments disclosed. Rather, it should be understood that the disclosure is intended to cover all modifications, equivalents, and alternatives falling within the spirit and scope of the disclosure as defined by the claim language.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure. Therefore all matter set forth is to be interpreted as illustrative and not in a limiting sense.

Example 1—Egg Replacer Formulas

Egg replacers disclosed herein contained no leavening ingredients, pigments, allergens, or ingredients which produce an off odor when hydrated. Its functionality is similar to egg and has a chickpea protein source. Egg replacers are great for baking and coating adhesion for breaded applications. These egg replacers impart texture, expansion for porosity, and emulsification similar to a traditional egg when used in baking applications. The results of replacing eggs with egg replacers disclosed herein show similar attributes in texture analysis, spread analysis, and sensory evaluation.

An egg replacer composition range from the ingredients is in Table 1. Table 2 consists of the level of work of each ingredient that demonstrated a positive result in the evaluation. The formulas in Table 2 are examples of egg substitutes formulations.

TABLE 1

Egg replacer

| Ingredients | wt % |
|---|---|
| Potato starch | 20-35% |
| Chickpea protein | 8-30% |
| Modified food starch | 30-45% |
| Dextrose | 1-7% |
| Sucrose | 0.5-5% |
| Xanthan gum | 1-5% |
| Methylcellulose | 2-7% |

TABLE 2

Example egg replacer formulas.

| | wt % | | | | | | | | | |
|---|---|---|---|---|---|---|---|---|---|---|
| Ingredients | 1 | 2 | 3 | 4 | 5 | 6 | 7 | 8 | 9 | 10 |
| Potato Starch | 28 | 28 | 28 | 28 | 28 | 28 | 28 | 28 | 28 | 28 |
| Chickpea Protein | 20 | 30 | 20 | 20 | 8 | 20 | 20 | 20 | 20 | 20 |
| Dextrose | 3 | 3 | 3 | 3 | 3 | 3 | 3 | 1 | 7 | 3 |
| Sucrose | 1 | 1 | 1 | 1 | 1 | 1 | 1 | 1 | 1 | 0.5 |
| Xanthan Gum | 4 | 4 | 4 | 4 | 4 | 1 | 3 | 4 | 4 | 4 |
| Modified food starch | 41 | 31 | 42 | 37 | 42 | 44 | 42 | 43 | 37 | 42.5 |
| Methyl Cellulose | 11 | 3 | 2 | 7 | 15 | 3 | 3 | 3 | 3 | 3 |

| | wt % | | | | | | | | |
|---|---|---|---|---|---|---|---|---|---|
| Ingredients | 11 | 12 | 13 | 14 | 15 | 16 | 17 | 18 | 19 |
| Potato Starch | 28 | 15 | 40 | 31 | 38 | 10 | 15 | 5 | 5 |
| Chickpea Protein | 20 | 20 | 10 | 15 | 13 | 20 | 30 | 30 | 30 |
| Dextrose | 3 | 3 | 3 | 3 | 3 | 10 | 3 | 8 | 3 |
| Sucrose | 5 | 1 | 1 | 3 | 1 | 1 | 5 | 7 | 5 |
| Xanthan Gum | 4 | 4 | 4 | 6 | 4 | 6 | 4 | 4 | 4 |
| Modified food starch | 37 | 54 | 39 | 37 | 32 | 50 | 40 | 43 | 50 |
| Methyl Cellulose | 3 | 3 | 3 | 5 | 7 | 3 | 3 | 3 | 3 |

Dextrose refers to D-glucose and may be non-GMO. Sucrose may be granulated sugar or granulated white sugar.

The label declaration for the disclosed egg replacer will list Modified Food Starch, Potato Starch, Chickpea Protein, Xanthan Gum, Dextrose, Methyl Cellulose, and Sugar. The hydration instructions for one whole egg equivalent is to mix 4 teaspoons (12.5 g) of egg replacer and 2.5 tablespoons (37.5 g) of water, then mix well.

Example 2—Prior Art Egg Replacers

The following are prior art egg replacers, some of which have been compared to Formula:

A. Bob's Red Mill Egg Replacer by Bob's Red Mill Natural Foods, Inc.
   a. Ingredient Declaration: Potato Starch, Tapioca Flour, Baking Soda, Psyllium Husk
   b. Hydration Instructions (1 egg equivalent)—Mix 1 Tbsp. of egg replacer with 2 Tbsp. water, mix well, and sit for 1 minute to thicken.
B. Vegg Uncaged Baking Mix—100% Plant-Based Egg Substitute by The Vegg LLC ("Vegg Egg").
   a. Ingredient Declaration: Pea Protein Isolate, Fortified Yeast Flakes, Niacin, Pyridoxine Hydrochloride, Riboflavin, Thiamin Hydrochloride, Folic Acid, Xanthan Gum, Sodium Alginate, Guar Gum, Indian Black Salt, Beta Carotene
   b. Hydration Instructions (1 egg equivalent)—Mix 1 tsp. of egg replacer with ½ tsp of sugar, then add ¼ cup of cold water, mix well, and sit for 15 minutes.

C. Follow Your Heart™ By Danone
  a. Ingredient Declaration: Organic soymilk powder, modified cellulose, gellan gum, cellulose, calcium lactate, carrageenan, natural flavors, nutritional yeast, black salt, carotene
  b. Hydration Instructions: Mix 1 Tbsp of egg replacer with ½ cup of cold water, and mix well.

D. Ener-G Egg™ Replacer by Ener-G Foods
  a. Ingredient Declaration: Potato Starch, Tapioca Flour, Leavening (Calcium Lactate, Calcium Carbonate, Cream of Tartar), Cellulose Gum, Modified Cellulose
  b. Hydration Instructions: Mix 1.5 tsp of egg replacer with 2 Tbsp. of warm water E. Organ "No Egg" Egg Replacer by Organ
  a. Potato Starch, Tapioca Starch, Raising Agent (Calcium Carbonate), Acidity Regulator (Citric Acid), Stabilizer (Vegetable Gum: Methylcellulose)
  b. Hydration Instructions: Mix 1 tsp of egg replacer with 2 Tbsp of water.

Generally, "1 Tbsp" is one tablespoon, equaling 15 ml of water and 15 g of dry egg replacer product. "1 tsp" is one teaspoon, equaling 3 ml of water and 3 g of dry egg replacer product.

Example 3—Comparative Bake Test

The efficacy of Formula 1 was evaluated in cupcakes made from Duncan Hines™ Perfectly Moist Yellow Cake Mix™. The mixing and cooking instructions labeled on the box were followed to prepare the cupcakes. The panel of the Duncan Hines cake mix box indicated three large eggs (~150 g). Each egg weighed about 50 g. In the experimental cupcakes with the egg substitutes, the 3 large eggs were replaced with the equivalent amount of egg replacer. For formula 1, one egg equivalent was made from 12.5 g of dry formula 1 product and 2.5 Tbsp. of water (37.5 g). Therefore, the three eggs equivalent was 36 g dry formula 1 and 112.5 mL of water. The baking cups were added to the cupcake pans, and 36 g of cake mix batter was added to each cup.

Cupcake application using Duncan Hines Perfectly Moist Classic Yellow Cake Mix Net Wt. 15.25 oz. (432 g) box by Conagra Brands. The cake recipe on the box panel indicates one cup of water (236.5 mL), three large eggs, and ½ cup (118 mL) of vegetable oil. The oven was preheated to 350° F. (177° C.). The cake mix, water, eggs, and oil were blended in a large bowl on low speed until moistened (about 30 seconds). The mixer speed we then increased to medium for 2 minutes. The batter was poured into baking cups for cupcakes. Each batch of 24 cupcakes were baked for 18-21 minutes. The baked cupcakes were allowed to cool in a pan on a wire rack for 15 minutes.

The baked cupcakes were evaluated for the following analyses:

Texture one hour after baking (45 min after cooling) and 24 hours after baking;

Porosity of the internal structure;

Height analysis of the structure;

Sensory analysis to observe color, surface texture, and mouthfeel.

The cupcake with formula 1 was much better in appearance and texture than the prior art products.

The TA-XT Plus Texture Analyzer evaluated the texture of the baked cupcakes. The double compression test measured the hardness, adhesiveness, resilience, cohesion, springiness, and chewiness of the cupcakes. Texture was analyzed at a preset speed of 5.0 mm/seconds, test speed of 1.0 mm/sec, post-test speed of 5.0 mm/second, strain of 50%, and trigger force of 5 g. The texture analysis was conducted at 1 hour and 24 hours after baking. The attributes correlating to a functional egg replacer are hardness, chewiness, springiness, and adhesion. The hardness value measures the peak force of the first compression at a 50% compressed strain. The hardness was measured in grams of force. Chewiness is the relationship between hardness×cohesiveness×elasticity, which measures the energy for chewing a solid food. The springiness measures how well a product springs back after the first compression. The adhesiveness indicates whether the cupcakes are sticky and adhere to the probe. The target is an adhesive value of less than 2.0, which delivers a smooth, moisture-limited surface. An adhesive value between 3-4 results in a smooth surface with a slightly sticky/tacky feel to the touch.

Cohesion measures how well the product stays together under compression. Cohesion is measured as a percentage but cannot be 100% cohesion. The cohesiveness typically ranges from 52-80%. Based on visual observations, sensory evaluation, and texture, Table 3 shows the target acceptability ranges typically used in the industry.

TABLE 3

Texture Attribute Ranges of Acceptability for 24-hour Stability.

| Texture Attribute | Ranges |
|---|---|
| Hardness (g) | 740-1140 |
| Adhesive | −2.5-4 |
| Resilience (%) | 20-35 |
| Cohesion | 0.50-0.70 |
| Springiness (%) | 75-95 |
| Chewiness | 423-623 |

Table 4 compares formula 1 to an egg-containing control and the prior art egg replacers one hour after baking, and Table 5 shows their values relative to control. The control (cupcake with egg) had the highest values for hardness, cohesion, springiness, and chewiness and a low value for adhesive. The cupcakes with formula 1 were more similar to the control than were the prior art egg replacers.

TABLE 4

Texture Analysis 1 Hour After Baking

| Egg type | Hardness | Adhesive | Resilience | Cohesion | Springiness | Chewiness |
|---|---|---|---|---|---|---|
| Control | 641.9 | −0.37 | 34.56 | 0.68 | 90.61 | 393.96 |
| No Egg ™ | 443.1 | −1.84 | 22.61 | 0.51 | 69.27 | 155.66 |
| Vegg Egg | 318.6 | 1.49 | 31.86 | 0.68 | 82.44 | 177.39 |
| Bob's Red Mill Replacer | 353.0 | −0.14 | 30.48 | 0.65 | 86.76 | 199.01 |
| 1 | 496.9 | −0.46 | 33.17 | 0.66 | 87.52 | 287.36 |

TABLE 4-continued

| Texture Analysis 1 Hour After Baking | | | | | | |
|---|---|---|---|---|---|---|
| Egg type | Hardness | Adhesive | Resilience | Cohesion | Springiness | Chewiness |
| 2 | 497.3 | −0.72 | 29.54 | 0.64 | 86.78 | 274.54 |
| 3 | 561.2 | 0.74 | 30.08 | 0.62 | 87.97 | 306.98 |
| 4 | 687.7 | −1.71 | 25.25 | 0.52 | 85.69 | 307.96 |
| 5 | 460.7 | 2.10 | 32.92 | 0.64 | 86.45 | 255.96 |
| 6 | 660.9 | −0.17 | 27.50 | 0.56 | 81.77 | 302.57 |
| 7 | 603.2 | −3.26 | 25.58 | 0.55 | 84.97 | 281.79 |
| 8 | 204.7 | 2.42 | 32.63 | 0.67 | 85.06 | 117.14 |
| 9 | 433.2 | −0.94 | 30.50 | 0.66 | 88.23 | 250.24 |
| 10 | 597.9 | 0.42 | 35.44 | 0.77 | 84.37 | 386.38 |
| 11 | 580.4 | −0.01 | 28.64 | 0.59 | 85.86 | 294.23 |
| 12 | 372.5 | 8.23 | 33.23 | 0.67 | 70.51 | 176.96 |
| 13 | 477.2 | −0.35 | 31.21 | 0.63 | 85.53 | 258.25 |
| 14 | 492.8 | −0.99 | 32.31 | 0.65 | 87.50 | 280.03 |
| 15 | 469.7 | −2.34 | 34.81 | 0.65 | 88.69 | 272.57 |
| 16 | 421.7 | 0.83 | 31.73 | 0.63 | 85.74 | 227.90 |
| 17 | 489.1 | 2.08 | 33.71 | 0.66 | 87.24 | 280.81 |
| 18 | 455.9 | −3.80 | 31.80 | 0.64 | 85.04 | 248.58 |
| 19 | 430.2 | −2.30 | 34.15 | 0.68 | 89.76 | 263.91 |

TABLE 5

| Texture Analysis 1 Hour After Baking relative to the Control | | | | | | |
|---|---|---|---|---|---|---|
| Egg Type | Hardness | Adhesive | Resilience | Cohesion | Springiness | Chewiness |
| Control | 1.00 | 1.00 | 1.00 | 1.00 | 1.00 | 1.00 |
| No Egg ™ | 0.69 | 4.97 | 0.65 | 0.75 | 0.76 | 0.40 |
| Vegg Egg | 0.50 | −4.03 | 0.92 | 1.00 | 0.91 | 0.45 |
| Bob's Red Mill Replacer | 0.55 | 0.38 | 0.88 | 0.96 | 0.96 | 0.51 |
| 1 | 0.77 | 1.27 | 0.96 | 0.97 | 0.97 | 0.73 |
| 2 | 0.77 | 1.95 | 0.85 | 0.94 | 0.96 | 0.70 |
| 3 | 0.87 | −2.00 | 0.87 | 0.91 | 0.97 | 0.78 |
| 4 | 1.07 | 4.62 | 0.73 | 0.76 | 0.95 | 0.78 |
| 5 | 0.72 | −5.68 | 0.95 | 0.94 | 0.95 | 0.65 |
| 6 | 1.03 | 0.46 | 0.80 | 0.82 | 0.90 | 0.77 |
| 7 | 0.94 | 8.80 | 0.74 | 0.81 | 0.94 | 0.72 |
| 8 | 0.32 | −6.54 | 0.94 | 0.99 | 0.94 | 0.30 |
| 9 | 0.67 | 2.54 | 0.88 | 0.97 | 0.97 | 0.64 |
| 10 | 0.93 | −1.14 | 1.03 | 1.13 | 0.93 | 0.98 |
| 11 | 0.90 | 0.03 | 0.83 | 0.87 | 0.95 | 0.75 |
| 12 | 0.58 | −22.24 | 0.96 | 0.99 | 0.78 | 0.45 |
| 13 | 0.74 | 0.95 | 0.90 | 0.93 | 0.94 | 0.66 |
| 14 | 0.77 | 2.68 | 0.93 | 0.96 | 0.97 | 0.71 |
| 15 | 0.73 | 6.32 | 1.01 | 0.96 | 0.98 | 0.69 |
| 16 | 0.66 | −2.24 | 0.92 | 0.93 | 0.95 | 0.58 |
| 17 | 0.76 | −5.62 | 0.98 | 0.97 | 0.96 | 0.71 |
| 18 | 0.71 | 10.27 | 0.92 | 0.94 | 0.94 | 0.63 |
| 19 | 0.67 | 6.22 | 0.99 | 1.00 | 0.99 | 0.67 |

Table 6 shows these same characteristics 24 hours after baking and Table 7 their values relative to control. Hardness and chewiness increased, indicating stabilization. The data show that the cupcakes with formula 1 were either firmer or neared to the control in hardness in 24 hours. Formula are slightly less than the control in chewiness, but they are significantly higher than the competitor's products.

TABLE 6

| Texture Analysis 24 Hours After Baking | | | | | | |
|---|---|---|---|---|---|---|
| Egg Type | Hardness | Adhesive | Resilience | Cohesion | Springiness | Chewiness |
| Control | 945.8 | −0.14 | 30.54 | 0.62 | 90.01 | 523.89 |
| Vegg Egg | 625.8 | 1.45 | 26.86 | 0.58 | 84.82 | 307.20 |
| 1 | 979.7 | 1.12 | 34.41 | 0.66 | 62.32 | 401.95 |
| 2 | 790.9 | −1.61 | 27.84 | 0.57 | 86.38 | 391.08 |
| 3 | 1120.1 | −2.20 | 27.19 | 0.56 | 87.53 | 545.63 |
| 5 | 1035.0 | −0.85 | 25.04 | 0.53 | 86.07 | 473.75 |

TABLE 6-continued

| Texture Analysis 24 Hours After Baking | | | | | | |
|---|---|---|---|---|---|---|
| Egg Type | Hardness | Adhesive | Resilience | Cohesion | Springiness | Chewiness |
| 6 | 1275.6 | −1.93 | 24.37 | 0.53 | 78.68 | 532.61 |
| 7 | 1088.7 | 3.44 | 24.74 | 0.52 | 83.13 | 469.38 |
| 8 | 762.9 | −0.89 | 30.52 | 0.60 | 87.46 | 403.17 |
| 9 | 808.8 | −0.01 | 31.29 | 0.63 | 87.69 | 444.26 |
| 10 | 1091.9 | −0.21 | 26.67 | 0.56 | 82.65 | 502.51 |
| 11 | 1061.5 | −0.72 | 24.70 | 0.53 | 83.62 | 474.10 |
| 12 | 897.6 | −1.24 | 28.38 | 0.57 | 86.82 | 445.31 |
| 13 | 915.8 | −2.02 | 26.76 | 0.54 | 84.28 | 422.19 |
| 14 | 663.1 | −2.11 | 27.83 | 0.56 | 85.84 | 317.39 |
| 15 | 717.4 | −1.27 | 29.79 | 0.57 | 87.82 | 361.51 |
| 16 | 764.6 | −4.03 | 26.49 | 0.55 | 84.80 | 357.70 |
| 17 | 968.2 | −2.23 | 30.49 | 0.60 | 87.04 | 502.14 |
| 18 | 952.8 | −0.45 | 29.56 | 0.58 | 88.27 | 489.12 |
| 19 | 760.2 | −1.48 | 31.57 | 0.61 | 89.04 | 410.02 |

TABLE 7

| Texture Analysis - 24-Hour Analysis After Baking relative to the Control | | | | | | |
|---|---|---|---|---|---|---|
| Egg Type | Hardness | Adhesive | Resilience | Cohesion | Springiness | Chewiness |
| Control | 1.00 | 1.00 | 1.00 | 1.00 | 1.00 | 1.00 |
| Vegg Egg | 0.66 | −10.36 | 0.88 | 0.94 | 0.94 | 0.59 |
| 1 | 1.04 | −8.00 | 1.13 | 1.06 | 0.69 | 0.77 |
| 2 | 0.84 | 11.50 | 0.91 | 0.92 | 0.96 | 0.75 |
| 3 | 1.18 | 15.71 | 0.89 | 0.90 | 0.97 | 1.04 |
| 5 | 1.09 | 6.07 | 0.82 | 0.85 | 0.96 | 0.90 |
| 6 | 1.35 | 13.79 | 0.80 | 0.85 | 0.87 | 1.02 |
| 7 | 1.15 | −24.57 | 0.81 | 0.84 | 0.92 | 0.90 |
| 8 | 0.81 | 6.36 | 1.00 | 0.97 | 0.97 | 0.77 |
| 9 | 0.86 | 0.07 | 1.02 | 1.02 | 0.97 | 0.85 |
| 10 | 1.15 | 1.50 | 0.87 | 0.90 | 0.92 | 0.96 |
| 11 | 1.12 | 5.14 | 0.81 | 0.85 | 0.93 | 0.90 |
| 12 | 0.95 | 8.86 | 0.93 | 0.92 | 0.96 | 0.85 |
| 13 | 0.97 | 14.43 | 0.88 | 0.87 | 0.94 | 0.81 |
| 14 | 0.70 | 15.07 | 0.91 | 0.90 | 0.95 | 0.61 |
| 15 | 0.76 | 9.07 | 0.98 | 0.92 | 0.98 | 0.69 |
| 16 | 0.81 | 28.79 | 0.87 | 0.89 | 0.94 | 0.68 |
| 17 | 1.02 | 15.93 | 1.00 | 0.97 | 0.97 | 0.96 |
| 18 | 1.01 | 3.21 | 0.97 | 0.94 | 0.98 | 0.93 |
| 19 | 0.80 | 10.57 | 1.03 | 0.98 | 0.99 | 0.78 |

The porosity of the internal structure ensures the cupcake is not compact, and contains pores and air pockets, allowing the leavening agents to expand. FIG. 1 shows a cupcake made with real egg. The internal structure is porous in texture. Pockets of air and small pores from the top to the base of the cupcake give the cupcake an open, not compact, texture. The internal color is yellow in color.

Figure 2:
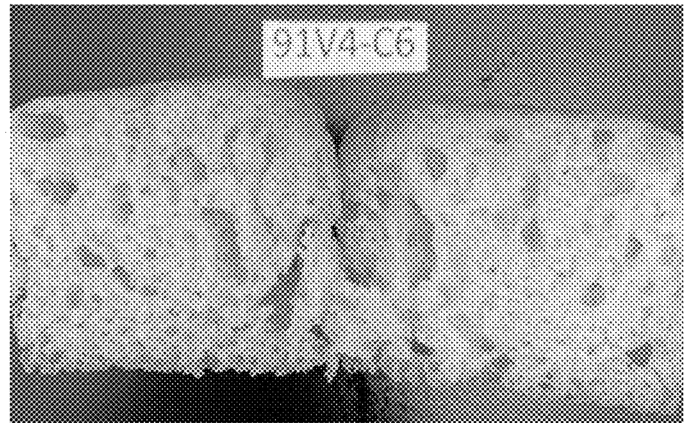
FIG. 2 shows a cupcake made with an egg replacer described herein.

Egg replacer formula 1 also has good porosity in its internal structure (FIG. 2). This cupcake is not compact and has large to small pores throughout. Egg replacer formula 1 does not contain leavening ingredients but nonetheless has an expansion functionality similar to real egg. The internal color is yellow, with a few shades lighter than the color. No pigments were added for color.

Figure 3:
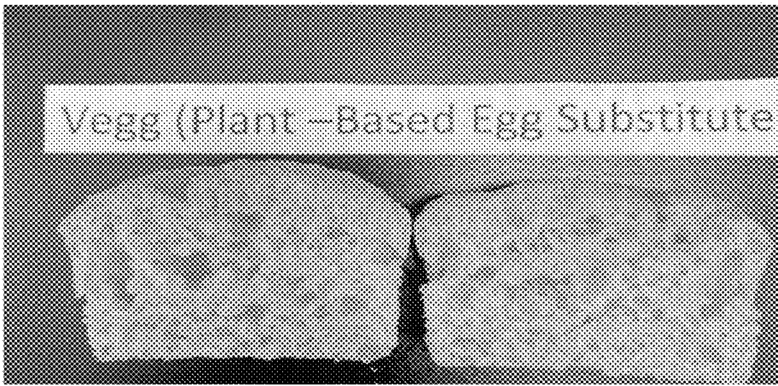
FIG. 3 shows a cupcake made with Vegg 100% Plant Based Egg Substitute.

Vegg Egg showed less expansion, resulting in a compact texture with less porosity (FIG. 3). The internal structure has some air pockets, but not as large as the control or formula 1. The texture of this product was thick and gummy. The internal color was yellow similar to the real egg control. This product contained beta-carotene for color.

Figure 4:
FIG. 4 shows a cupcake made with Bob's Red Mill Egg Replacer.

Bob's Red Mill Egg Replacer is very compact at its base, with little to no expansion at the base (FIG. 4). The top and middle of the internal structure shows some expansion and porosity. Bob's Red Mill egg replacer is inferior to the control and formula 1 egg replacer. The internal color of Bob's Red Mill is tan/brown, it doesn't represent an egg.

Figure 5:
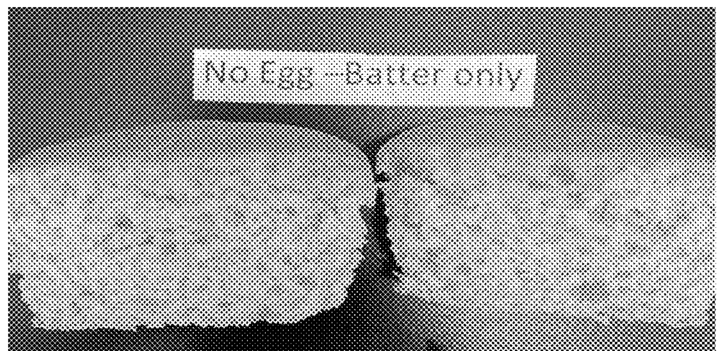
FIG. 5 shows a cupcake made without egg or an egg replacer (batter only) as a negative control for comparison.

The internal texture is very compact from top to base when no egg or egg replacer was used (FIG. 5). The porosity is low to none and with very small pores. The egg during baking provides great expansion, creating air pockets with a lighter texture. These observations demonstrated the physical properties of egg in baking applications. The texture of this cupcake is very crumbly.

Example 4—Sensory Panel

A baked product with formula 1 was compared in a sensory panel with a product prepared with Vegg Egg. All samples were prepared identically, only difference would have been oven placement, The panelists in Keokuk, Iowa and Bell, California were trained in the descriptive attributes using a mini cupcake (with real egg) before receiving the sensory cupcake samples for evaluation. Each trained panelist was presented with a labeled control cupcake sample; one cupcake sample labeled "45VE" and another cupcake labeled "91V4." Only the test administrators knew which test samples contained formula 1. The panelists were asked to individually evaluate both test cupcake samples (45VE & 91V4) and place an "x"

on the attribute for each test sample that most closely resembled the control with real egg. Water was provided to cleanse the palate between samples.

Results are summarized in Table 8. The total number of participants was 91. "Total (n)" exclude participants who misunderstood the instructions and marked both samples as being closest to control or wrote comments instead of marking the questionnaire with an "x."

TABLE 8

Egg replacer sensory results

| Egg replacer | Vegg Egg | Formula 1 | Total (n) |
|---|---|---|---|
| External Surface | | | |
| Color | 33/39.3% | 51/60.7% | 84 |
| Stickiness* | 20/37% | 34/63% | 54 ‡ |
| Shine | 42/48.8% | 45/52.3% | 87 |
| Uniformity | 25/29.4% | 60/70.6% | 85 |
| Bottom Crust Texture | 29/36.7% | 50/63.3% | 79 |
| Internal Structure | | | |
| Color | 36/43.8% | 48/57/1% | 84 |
| Porosity | 36/41.2% | 50/58.1% | 86 |
| Mouthfeel | 25/28.4% | 63/71.6% | 88 |
| Taste/flavor | 28/33.7% | 55/66.3% | 83 |
| Which is similar to control | 23/27.7% | 60/72.3% | 83 |
| Total (n) | 297/27.7% | 516/72.3% | 813 |

*Results (α 0.05%/Two Tailed p-values)

† The control made with real egg based on the Duncan Hines direction for use.

‡ Only panelists in Keokuk assessed stickiness.

After statistical analysis of the data from Table 9, the following qualitative results were found:

Internal Surface: 100% chance formula 1 is more similar to control with egg (p-value 0) than Vegg Egg.

Bottom Crust Texture: 99.96% chance formula 1 is more similar to control with egg (p-value 0.00086) than Vegg Egg.

Internal Structure: 99.86% chance formula 1 is more similar to control with egg (p-value 0.00282) than Vegg Egg.

Taste/Flavor: 99.99% chance that formula is more similar to control with egg (p-value $2.95\times10^{-5}$) than Vegg Egg.

Overall Which is Similar to Control: 100% chance that formula 1 is more similar to control with egg (p-value 0) than Vegg Egg.

The panelists also commented about the baked product containing Formula 1: very uniform color; looks better; even smooth surface; more vanilla flavor; closer flavor to control; Formula 1 is better; spongy, non-sticky mouthfeel; more moist, better than the control; taste better than control; better in everything; closer appearance, normal cake consistence, no off flavors or aftertaste; better internal structure; similar texture and look; and holds better similar to control.

In summary, Formula 1 provided similar functionality as an egg (control) in baking applications. Formula 1 provides better functionality than the prior art products without added leavening agents, colors, or allergens. Egg replacer formula 1 also has a simple hydration instruction step and a neutral to pleasant odor while mixing. In contrast, Vegg Egg has an offensive strong odor when hydrated. Formula 1 delivers emulsification, expansion, strength, texture enhancing, coloring, and a source of protein.

Example 5—Moisture and Height

The moisture content of cupcake containing Formula 1 were compared to real egg and commerically-available egg replacers, as shown in Table 9. The moisture was analyzed using the Rapid Moisture Analyzer from CEM Corporation one hour after baking. The CEM program was set for 90% power, temperature at 110° F. for 5 minutes to analyze the moisture of the samples.

TABLE 9

Moisture content of cupcake samples 1 hour after baking

| Descriptor | Moisture Level |
|---|---|
| Cupcake with Real Egg | 36.8% |
| Cupcake with Formula 1 | 38.3% |
| Cupcake with Bob's Red Mill Egg Replacer | 34.8% |
| Cupcake with Vegg's Egg Replacer | 34.4% |
| Cupcake with No Egg | 31.7% |

The height of the cupcakes were measured in millimeters using a Neiko Precision Height 24 hours after baking. The height range of a cupcake that was measured at a 36 g weight batter, should expand at an acceptable height of 35-41 mm. The higher the height the more the dough expanfed, creating a pourous internal structure. The lower the height, the more compact the structure.

The control cupcake (containing egg) measured at a height of 38.5 mm, whereas the cupcake with Formula 1 was 37.6 mm. Based on height, the pore characteristics and dough expansion were similar between the control and Formula 1. The competitor's egg replacer was shorter and displayed limited expansion or compaction at the base of the cupcake. However, too much expansion and porosity can create a cupcake that is flaky, resulting in a height of 42.9 mm. Referring to a cupcake with Vegg Egg, the height evaluation and visual observation showed expansion, but these attributes are not acceptable due to its soft texture, which related to low hardness and high gumminess. The 24-hour texture analysis for Vegg Egg resulted in a hardness attribute of 625.7 g vs. the control at 945.8 g and Formula 1 cupcake at 979.7 g hardness.

TABLE 10

Cupcake height measurements

| Description | Height (mm) | Relative to Control |
|---|---|---|
| Cupcake with real egg (Control) | 38.5 | 1.00 |
| Cupcake with Bob's Red Mill | 33.8 | 0.88 |
| Cupcake with Vegg Egg Replacer | 35.6 | 0.92 |
| Cupcake with Formula 1 | 37.6 | 0.98 |
| Cupcake with Formula 2 | 40.5 | 1.05 |
| Cupcake with Formula 3 | 37.8 | 0.98 |
| Cupcake with Formula 4 | 35.4 | 0.92 |
| Cupcake with Formula 5 | 35.5 | 0.92 |
| Cupcake with Formula 6 | 35.8 | 0.93 |
| Cupcake with Formula 7 | 35.7 | 0.93 |
| Cupcake with Formula 8 | 36.8 | 0.96 |
| Cupcake with Formula 9 | 36.0 | 0.94 |
| Cupcake with Formula 10 | 35.7 | 0.93 |
| Cupcake with Formula 11 | 36.4 | 0.95 |
| Cupcake with Formula 12 | 37.8 | 0.98 |
| Cupcake with Formula 13 | 36.3 | 0.94 |
| Cupcake with Formula 14 | 35.8 | 0.93 |
| Cupcake with Formula 15 | 38.4 | 1.00 |
| Cupcake with Formula 16 | 37.6 | 0.98 |
| Cupcake with Formula 17 | 36.5 | 0.95 |
| Cupcake with Formula 18 | 37.5 | 0.97 |
| Cupcake with Formula 19 | 38.6 | 1.00 |

All references, patents or applications, U.S. or foreign, cited in the application are as a result of this incorporated by reference as if written herein in their entireties. Where any inconsistencies arise, the material disclosed herein controls.

From the preceding description, one skilled in the art can easily ascertain the essential characteristics of this invention, and without departing from the spirit and scope thereof, can make various changes and modifications of the invention to adapt it to various usages and conditions.

What is claimed is:

1. A egg replacer, comprising:

40-80 wt % starch;

5-30 wt % alternative protein;

1-10 wt % gellant; and 1-20 wt % soluble fiber, wherein the soluble fiber comprises methylcellulose.

2. The egg replacer of claim 1, wherein the egg replacer is substantially free from rising agents.

3. The egg replacer of claim 1, wherein the starch is selected from the group consisting of corn starch, wheat starch, rice starch, sago starch, tapioca starch, tapioca flour, sorghum starch, potato starch, and combinations thereof.

4. The egg replacer of claim 1, wherein the starch comprises potato starch and modified food starch, and wherein the egg replacer comprises 20-35 wt % of the potato starch and 30-45 wt % of the modified food starch.

5. The egg replacer of claim 3, wherein the starch comprises the potato starch and modified food starch, and wherein the egg replacer comprises 5-28 wt % of the potato starch and 37-44 wt % of the modified food starch.

6. The egg replacer of claim 1, wherein the alternative protein is selected from the group consisting of pea, soy, yeast, and chickpea, and combinations thereof.

7. The egg replacer of claim 1, wherein the alternative protein comprises chickpea protein.

8. The egg replacer of claim 7, wherein the egg replacer comprises 8-30 wt % of the chickpea protein.

9. The egg replacer of claim 1, wherein the gellant is selected from the group consisting of carrageen, pectin, gelatin, agar, calcium alginate, xanthan gum, guar gum, konjac flour, locust bean gum, gellan gum, cellulose gum, and combinations thereof.

10. The egg replacer of claim 9, wherein the gellant comprises the xanthan gum, and wherein the egg replacer comprises 1-6 wt % of the xanthan gum.

11. The egg replacer of claim 1, wherein the soluble fiber comprises the methylcellulse-methylcellulose and at least one additional fiber selected from the group consisting of cellulose, modified cellulose psyllium, inulin, beta-glucan, glucomannan, and combinations thereof.

12. The egg replacer of claim 1, wherein the egg replacer comprises 2-7 wt % of the methylcellulose.

13. The egg replacer of claim 2, further comprising 1-17 wt % sugar.

14. The egg replacer of claim 13, wherein the sugar is selected from the group consisting of glucose, dextrose, sucrose, lactose, galactose, maltose, mannose, fructose, xylose, and combinations thereof.

15. The egg replacer of claim 14, wherein the sugar is selected from the group consisting of the glucose, the dextrose, the sucrose, and combinations thereof.

16. The egg replacer of claim 15, wherein the sugar comprises the dextrose and the sucrose, and wherein the egg replacer comprises 1-10 wt % of the dextrose and 0.5-7 wt % of the sucrose.

17. The egg replacer of claim 15, wherein the sugar comprises the dextrose and the sucrose, and wherein the egg replacer comprises 1-7 wt % of the dextrose and 0.5-5 wt % of the sucrose.

18. The egg replacer of claim 1, comprising:

20-35 wt % potato starch;

30-45 wt % modified food starch;

8-30 wt % chickpea protein;

1-7 wt % dextrose;

0.5-5 wt % sucrose;

1-5 wt % xanthan gum; and 2-7 wt % of the methylcellulose.

19. The egg replacer of claim 2, comprising:

5-28 wt % potato starch;

37-44 wt % modified food starch;

8-30 wt % chickpea protein;

3-8 wt % dextrose;

0.5-7 wt % sucrose;

1-4 wt % xanthan gum; and 2-15 wt % of the methylcellulose.

20. A mix for a food product, the mix comprising 4 teaspoons (12.5 g) of the egg replacer of claim 1 for each egg that would have been used in the mix without the egg replacer.

21. A method of using an egg replacer, comprising mixing 4 teaspoons (12.5 g) of the egg replacer of claim 1 with 2.5 tablespoons (37.5 g) of water to form one portion of hydrated egg replacer.

22. A food product comprising the egg replacer of claim 1.

* * * * *